United States Patent
Kameda

(10) Patent No.: US 7,593,293 B2
(45) Date of Patent: Sep. 22, 2009

(54) OPTICAL DISK DRIVE

(75) Inventor: Hiroyuki Kameda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 273 days.

(21) Appl. No.: 11/715,447

(22) Filed: Mar. 8, 2007

(65) Prior Publication Data

US 2007/0211584 A1 Sep. 13, 2007

(30) Foreign Application Priority Data

Mar. 13, 2006 (JP) ............................. 2006-067846

(51) Int. Cl.
*G11B 7/085* (2006.01)
(52) U.S. Cl. .............. 369/30.15; 369/30.16; 369/44.26; 369/44.29
(58) Field of Classification Search ................. 369/30.1, 369/30.13, 44.25–44.29, 44.32, 53.2, 53.32, 369/275.2–275.4, 30.15, 30.16
See application file for complete search history.

(56) References Cited

U.S. PATENT DOCUMENTS 6,920,092 B2 * 7/2005 Kuriuzawa et al. ........ 369/44.28

2003/0067849 A1 * 4/2003 Mikami .................... 369/44.25

FOREIGN PATENT DOCUMENTS

| JP | 2003-109233 | 4/2003 |
| JP | 2004-055125 | 2/2004 |

* cited by examiner

*Primary Examiner*—Wayne R Young
*Assistant Examiner*—Brian Butcher
(74) *Attorney, Agent, or Firm*—Pillsbury, Winthrop Shaw Pittman, LLP

(57) ABSTRACT

An optical disk drive includes a pickup head, a servo circuit, and a controller. An optical disk has a first area and a second area for which different tracking methods are to be used. The controller may cause the pickup head to make a seek for a target address in the first area from a position in this area that is farther from the boundary between the two areas than the address. If the controller cannot perform tracking servo control after the seek is made, and if the calculated address is located in a critical region, the controller immediately causes the pickup head to make a seek by a specified number of addresses toward the position farther from the boundary. After the seek is made, the controller performs tracking servo control again.

3 Claims, 4 Drawing Sheets

OPTICAL DISK DRIVE

CROSS REFERENCE

This nonprovisional application claims priority under 35 U.S.C. § 119(a) on Patent Application No. 2006-67846 filed in Japan on Mar. 13, 2006, the entire contents of which are hereby incorporated by reference.

BACKGROUND OF THE INVENTION

Optical disk drives have conventionally been made fit for practical use. Data can be recorded on and read from an optical disk by setting the disk on the main body of an optical disk drive and irradiating the disk with a laser beam from the pickup head of the drive. Optical disk drives can read data by discriminating various types of optical disks such as DVD-RAMs and DVD-Rs. A DVD-RAM has a rewritable area and an embossed area. Different methods of tracking servo control are to be used for the two areas.

An optical disk drive that reads DVD-RAMs calculates an address by calculating the number of tracks from the light reflected by the optical disk during a seek. Even though the seek is made while the address is thus calculated, the address just after the seek is liable to differ from the target value due to the inertia of the pickup head that is created during the seek, the dust on the optical disk, etc. Consequently, if a seek is made for an address near the boundary between the rewritable and embossed areas, the beam spot may stop at the wrong area. In this case, no tracking servo control can be performed because the method of tracking servo control for the wrong area differs from the method of tracking servo control for the right area.

A method for moving the pickup head to a condition under tracking servo control includes trying tracking servo control some more times at the address where no tracking servo control was able to be performed. According to this method, if the control trial enables no tracking servo control, the beam spot is moved a long distance to an address where tracking servo control can be performed reliably, and thereafter tracking servo control is performed again.

JP-2003-109233A discloses an optical disk drive that performs tracking servo control for the two areas of a DVD-RAM by determining whether each of them is the rewritable area. This Japanese document also discloses that the determination is performed by detecting from an RF signal the header signal of a sector existing only in the rewritable area. JP-2004-55125A refers to a method for detecting such a header signal.

The foregoing prior art is such that, if no tracking servo control can be performed just after a seek is made for an address, the pickup head is moved to a condition under tracking servo control after it is moved by trying tracking servo control some times at this address. Accordingly, useless tracking servo control may be tried some times by the wrong method of tracking servo control. This makes it take time to move to the pickup head to a condition under tracking servo control.

JP-2003-109233A is such that it is always determined, regardless of track position, whether each of the two areas is the rewritable area. This may result in needless determination, so that the operating speed of the whole disk drive may be low. As a result, if one or more of the files recorded on the optical disk are skipped, it takes time to move the beam spot to the head of the target picture or sound.

SUMMARY OF THE INVENTION

The object of the present invention is to provide an optical disk drive that reads an optical disk having two or more areas for which different methods of tracking servo control are to be used, the disk drive being such that, if it can perform no tracking servo control after its pickup head makes a seek, the head is moved to a condition under tracking servo control quickly so that the disk drive can quickly output an target picture or sound.

An optical disk drive according to the present invention comprises:

a main body;

a pickup head for radiating a laser beam to a beam position on an optical disk set on the main body, the disk having a plurality of tracks;

a controller for performing tracking servo control for causing the beam position to follow the tracks;

a disk discriminating means for determining whether the optical disk has areas of a first area and a second area for which the tracking servo control is to be performed by a first method and a second method respectively, some of the tracks being formed in the first area, the other tracks being formed in the second area;

a seeking means for causing the pickup head to make a seek; and, an estimating means for estimating the beam position where a laser beam is radiated from the pickup head stopping after the head is moved to make a first seek by the seeking means; wherein;

the seeking means being adapted to cause the optical head to make a second seek toward a direction of moving away from a boundary between the areas, on the area including a target of the first seek, under all the conditions of the following A-D, after the first seek is made; and, the controller being adapted to perform the tracking servo control after the second seek is made.

A. the controller cannot performed the tracking servo control at the beam position after the first seek is made;

B. the discriminating means determines that the optical disk has the areas;

C. the first seek is made toward the direction of moving near the boundary;

D. the beam position estimated after the first seek is made is inside a specified critical region including the boundary.

DETAILED DESCRIPTION OF THE INVENTION

Figure 1:
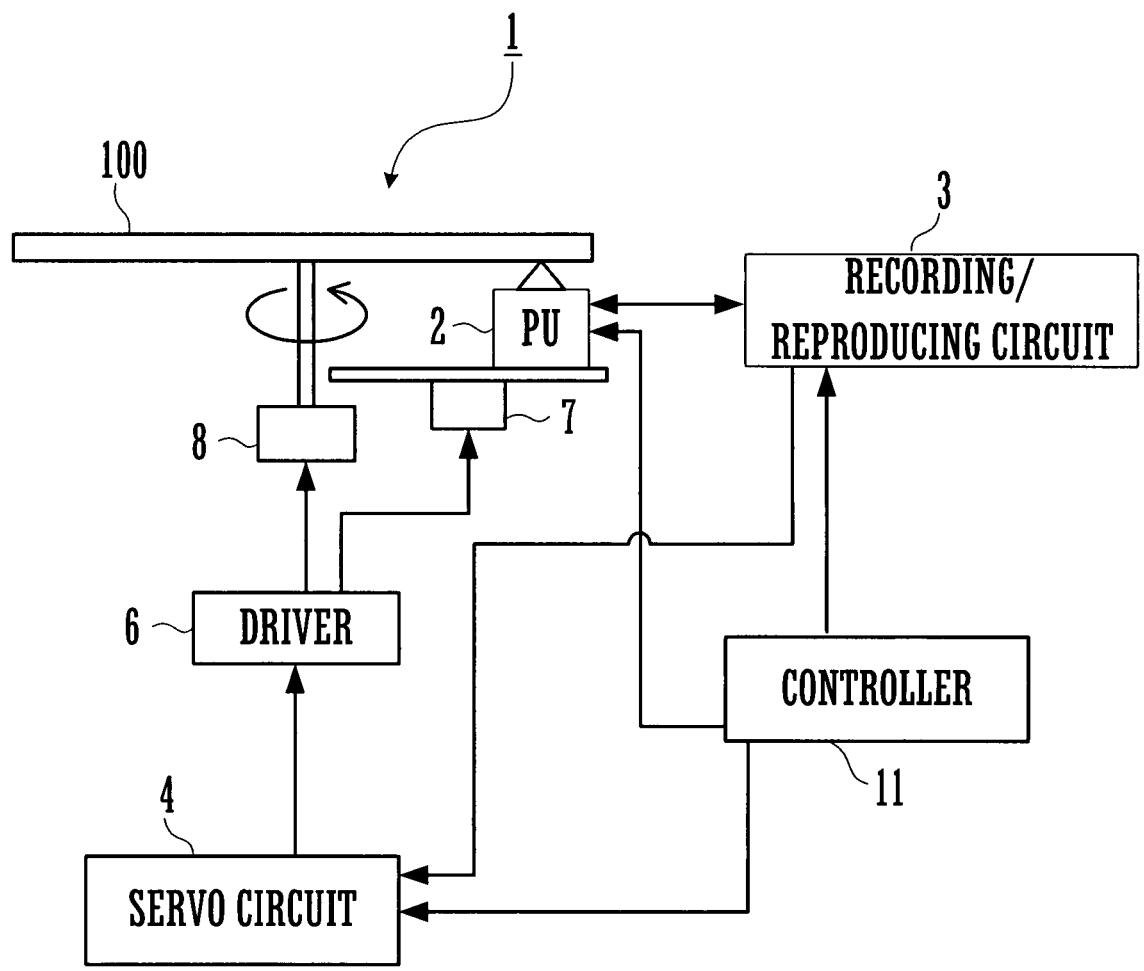
FIG. 1 is a schematic diagram of an optical disk drive according to an embodiment of the present invention.

FIG. 1 is a schematic diagram of an optical disk drive 1 according to an embodiment of the present invention. FIG. 1 shows the components of the disk drive 1 that are related to its tracking servo control operation. The components of the disk drive 1 that are not shown may be known components.

The disk drive 1 includes a pickup (PU) head 2, a reproducing circuit 3 such as an RF amplifier, a servo circuit 4, a driver 6 for servo control, a thread motor 7, a spindle motor 8, and a controller 11. The PU head 2 reads the data recorded on an optical disk 100 set on the disk drive 1. The servo circuit 4 generates a driving signal. The thread motor 7 causes the PU head 2 to make a seek. The spindle motor 8 rotates the disk 100. The controller 11 controls the disk drive 1.

The PU head 2 includes a laser diode (LD), a beam splitter, an objective lens, a photodetector, and a two-axis actuator, which are not shown.

The laser diode is a light source that emits a laser beam. The photodetector consists of receiving elements and detects the light reflected by the disk 100. The receiving surface of the photodetector may be divided into four receiving zones that are nearly equal in area. Alternatively, the photodetector may detect a tracking error by the three-beam method. The photodetector may have any other structure that can detect tracking and focusing errors.

Because the beam splitter and the objective lens are well known and may have conventional structures, they will not be described.

The laser beam from the laser diode is radiated through the beam splitter and the objective lens to the beam spot on the disk 100. The light reflected by the disk 100 is detected through the objective lens and the beam splitter by the photodetector.

The PU head 2 is supported by a shaft extending radially of the disk 100 and can be moved along the shaft by the thread motor 7.

The reproducing circuit 3 adds up all outputs from the receiving elements of the PU head 2, generates an RF signal, and amplifies the signal. The reproducing circuit 3 processes the amplified RF signal and takes out a video signal. The reproducing circuit 3 also generates tracking and focusing error signals by specified operations with respect to the outputs from the receiving elements. The reproducing circuit 3 may additionally function as a recording circuit, which amplifies the digital signal supplied from an encoder-decoder (not shown) and supplies the amplified signal to the laser diode of the PU head 2. Thus the reproducing circuit 3 records data in the disk 100.

Based on the tracking and focusing error signals from the reproducing circuit 3, the servo circuit 4 generates tracking and focusing servo signals for tracking and focusing adjustments respectively.

Based on the seek control signal input from the controller 11, the servo circuit 4 generates a thread motor driving signal and outputs it to the driver 6. The driving signal controls the thread motor 7.

The driver 6 is an amplifier that amplifies the tracking and focusing servo signals and the thread motor driving signal. The driver 6 supplies the two-axis actuator and the thread motor 7 with electric power that drives the actuator and this motor. The servo circuit 4 and the driver 6 enable the beam spot to follow a target track on the disk 100.

Hereinafter, tracking servo control means servo control of the two-axis actuator based on a tracking servo signal.

The thread motor 7 causes the PU head 2 to make a seek radially of the disk 100, moving the beam spot. The PU head 2 could be moved by another means than the thread motor 7, for example, a linear motor to make a seek radially of the disk 100.

The spindle motor 8 rotates the disk 100.

The controller 11 may be a microcomputer and controls various components of the disk drive 1. The controller 11 performs a disk discriminating function, an estimating function, and a moving function. The discriminating function determines whether the disk 100 has two areas for which different methods of tracking servo control are to be used. The estimating function estimates the beam spot. The moving function moves the PU head 2 to a condition under tracking servo control when no tracking servo control can be performed.

Figure 2:
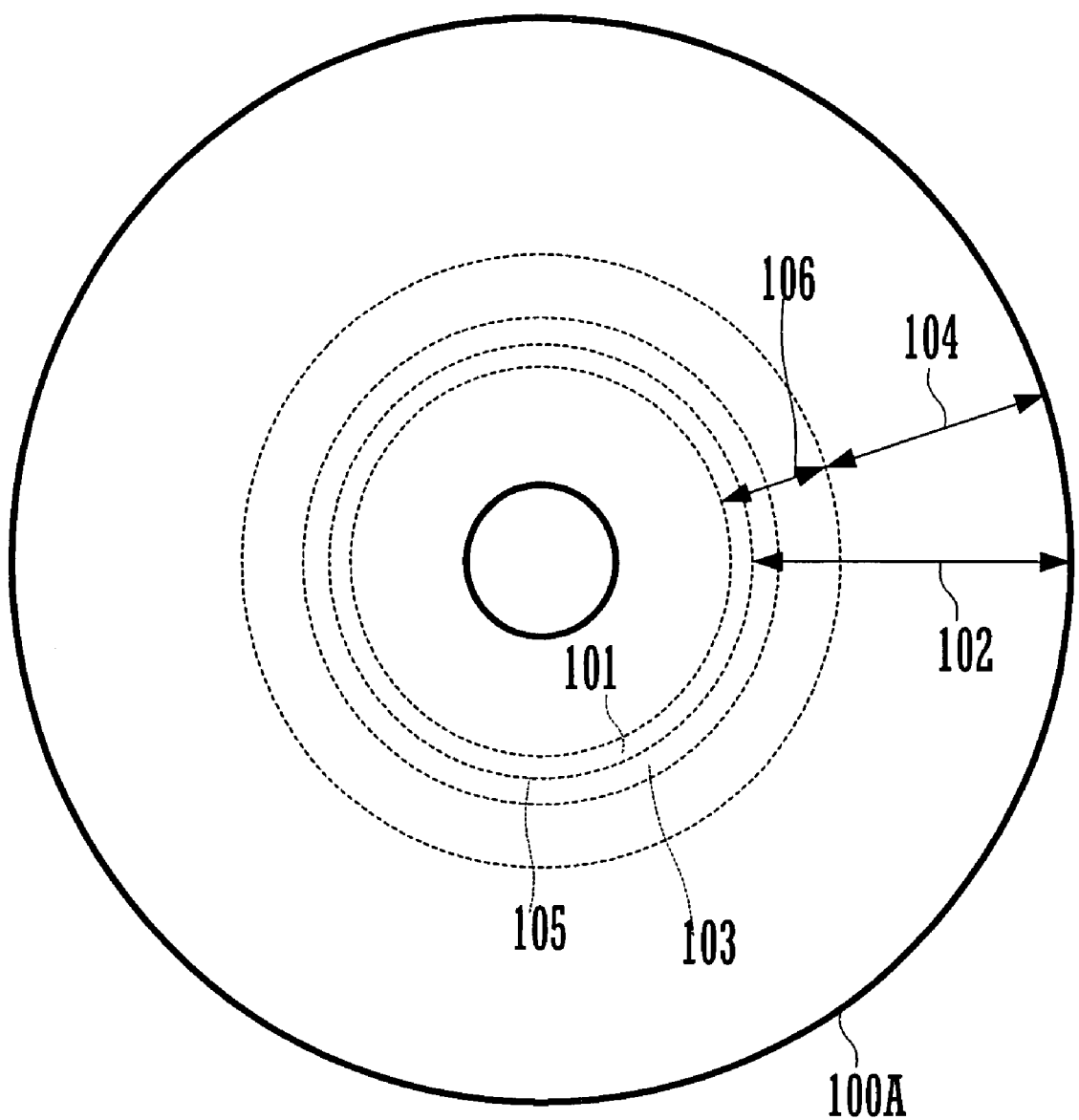
FIG. 2 is a plan view of an optical disk (a DVD-RAM) for use with this embodiment, showing the different areas on the disk.

FIG. 2 is a plan view of a DVD-RAM 100A that the disk drive 1 reads and writes. The disk 100A has an embossed area 101 and a rewritable area 102, which surrounds the embossed area. The embossed area 101 extends at a radius of about 24 mm of the disk 100A and has addresses up to 30,000 h. The rewritable area 102 includes a lead-in-zone rewritable area 103, a data-zone rewritable area (refer to page 37 of ecma-330.pdf on Internet (http://www.ecma-international.org/publications/files/ECMA-ST/Ecma-330.pdf)), and a user area 104. The lead-in-zone rewritable area 103 extends at the first parts of the addresses of the rewritable area 102. The user area 104 has addresses of 34,200 h and higher (refer to page 62 of above-mentioned ecma-330.pdf on Internet). The disk 100A also has a critical region 106, which will be described later on.

The servo operation of the disk drive 1 will be described below with reference to FIGS. 1 and 2.

The PU head 2 radiates a laser beam to the beam spot on the disk 100. The photodetector of the PU head 2 detects the light reflected by the disk 100. This causes data recorded on the disk 100 to be read out optically. When the DVD-RAM 100A is read, tracking servo control may be performed by the DPD method and the push-pull method (refer to JP-2003-109233A). The DPD method is a method for generating a tracking error signal by computing the phase differences between the signals output from the four receiving elements of the photodetector divided radially of the disk 100 (100A). The push-pull method is a method for generating a tracking error signal from the differential signals output from the receiving elements of the radially divided photodetector, or generating a tracking error signal by radially differencing the signals output from the receiving elements. When the DVD-RAM 100A is read, tracking servo control is performed for the embossed area 101 and the rewritable area 102 by the DPD and push-pull methods respectively.

Thus, a DVD-RAM is an optical disk having two or more areas for which different methods of tracking servo control are to be used. There may be a case where no tracking servo control can be performed for one of the areas because of a wrong method of tracking servo control being used for it.

This is exemplified with reference to FIGS. 1 and 2 by a case where, as a result of a seek for a target track in the rewritable area 102 from another track in this area, the beam spot moves erroneously into the embossed area 101 across the boundary 105 between the two areas.

While the seek is made, the controller 11 calculates the target address from the intensity of the light reflected by the optical disk. However, because of the inertia created when the seek is made, the dust on the optical disk, and other factors, it is impossible for the servo circuit 4 to make the calculated address reach the target value, only by driving the thread motor 7 for the seek. If the target track in the rewritable area 102 is close to the boundary 105, the seek may cause the beam spot to move across the boundary into the embossed area 101, for which the DPD method is to be used for tracking servo control, although the controller 11 assumes the push-pull method. In this case, no tracking servo control can be performed even if the controller 11 repeats tracking servo control for the embossed area 101.

Figure 3:
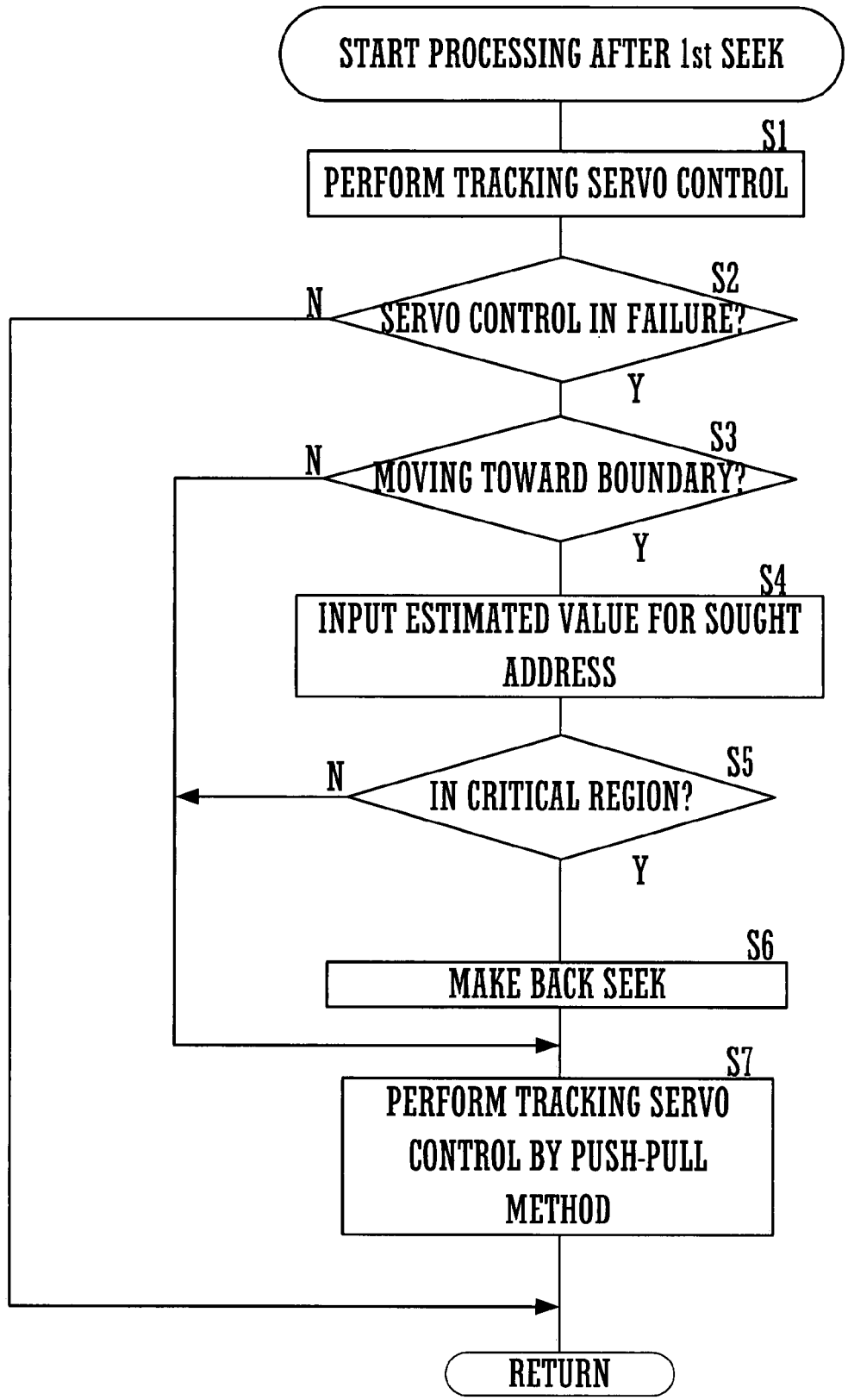
FIG. 3 is a flowchart of the processing after a first seek according to this embodiment.

FIG. 3 shows the flow of the operation performed by the controller 11 for tracking servo control after the PU head 2 makes a first seek. The operation flow represents the operation performed by the controller 11 after the first seek is made for a target address in the rewritable area 102, with tracking servo control performed for this area. With reference to FIG. 3, if the determination at steps S2, S3, and S5 results in yes, it can be assumed that the beam spot has moved erroneously to an address in the embossed area 101. In this case, a second seek is made at S6 immediately without trying tracking servo control some times at this address.

S1 is the step of performing tracking servo control at the address to which the beam spot moved as a result of the first seek.

S2 is the step of determining whether the tracking servo control failed. If the control has failed (yes at S2), the operation process goes to S3. If the control has succeeded (no at S2), the process ends.

S3 is the branch step performed if the tracking servo control has failed. S3 is the step of determining whether the beam spot moved toward the boundary 105 when the first seek was made. If the beam spot has moved toward the boundary 105 (yes at S3), the process goes to S4. If the beam spot has moved away from the boundary 105 (toward the outer edge of the disk 100) (no at S3), the process goes to S7.

The process goes to S3 because the tracking servo control failed (yes at S2). If the process goes to S3 and beam spot has moved toward the boundary 105 (yes at S3), a laser beam may be radiated to an address in the wrong area on the disk 100 after the first seek. No tracking servo control can be performed for the wrong area because the method of tracking servo control for it differs from the assumed method. In this case, because the servo control at this address is vain, steps S4-S7 will be performed.

If the beam spot has moved to an address away from the boundary 105 (no at S3), the method of tracking servo control used before the first seek can be used, and the assumed method (the push-pull method) of tracking servo control must be right. In this case, accordingly, the process goes to S7, which is the step of performing tracking servo control again. In this case (no at S3), at S7, tracking servo control should be performed again at almost the same address as performed at S1, without the second seek at S6, because the second seek as made at S6 would be vain.

S4 is the step of inputting a value estimated as the address for which the first seek was made. This value may be estimated from the number of tracks counted as the number of times the light reflected by the disk 100A changes in intensity. Alternatively, the value may be the address estimated from the distance of movement calculated from the number of rotations of the thread motor 7. The value found at S4 is an estimated value because the address may be inaccurate due to the dust on and the flaws etc. in the disk surface. It is determined at S5 whether the estimated value represents an address in the critical region.

S5 is the step of determining whether the address input at S4 is located in a specified critical region including the boundary (for example, critical region 106 in FIG. 2). If the input address is located in the critical region (yes at S5), the process goes to S6. If not (no at S5), the process goes to S7 which is the step of performing tracking servo control again, because the second seek as made at S6 would be vain. It is determined at S5 whether the input address is located in the critical region because, when the beam spot moves near the boundary 105, the spot may be positioned in the wrong area on the disk 100 after the first seek, so that the wrong method of tracking servo control may be used.

S6 is the step of moving the beam spot back by making the second seek (a back seek) by a specified number of addresses. Step S6 is performed if it is assumed from the determination at S2, S3, and S5 that the method of tracking servo control is wrong because the beam spot is positioned in the wrong area just after the first seek. In this case, the second seek is made toward the rewritable area 102 (or toward a direction of moving away from the boundary 105) so that tracking servo control can be performed reliably by the push-pull method. The specified number of addresses makes the beam spot move reliably toward the rewritable area 102. It is preferable that this number of addresses be small.

S7 is the step of performing tracking servo control by the push-pull method, which is suitable for the rewritable area 102.

Because the beam spot has been moved reliably to the rewritable area 102 at S6, it is possible to perform tracking servo control reliably by the push-pull method at S7. This makes it possible to move the PU head 2 to a condition under tracking servo control more quickly than to move it toward the outer edge of the disk 100 after tracking servo control is tried many times. If a seek is made for a target address outside the critical region (no at S5), the seek at S6 is not made, so that the operating speed of the whole disk drive 1 is prevented from lowering. This makes it possible to quickly output the target picture or sound.

After further tracking servo control, the controller 11 can move the beam spot to the target address, with the PU head 2 under tracking servo control. This makes it possible to quickly move the beam spot to the head of the target picture or sound.

The critical region mentioned at S5 in FIG. 3 may be the critical region 106 (FIG. 2), which includes the embossed area 101, the lead-in-zone rewritable area 103, and the area between this area 103 and the user area 104. The address at the boundary 105 of the rewritable area 102 is 30,000 h. The first address in the user area 104 is 34,200 h. Accordingly, the critical region 106 may extend from the first address in the embossed area 101 up to 34,200 h. The width of the critical region 106 up to 34,200 h is narrower than about 10 mm in the radial directions on the disk 100A. Therefore, the distance for which the beam spot has moved may be calculated from the number of rotations of the thread motor, and the address after a seek is made may be calculated from the distance so that it can be determined whether this address is located in the critical region.

It is not essential that the controller 11 of the disk drive 1 should have a control program for both of the DPD and push-pull methods. For example, if the embossed area 101 is not read, it is essential that the push-pull method for reading the rewritable area 102 be used. If the disk drive 1 can perform no tracking servo control because the beam spot has moved to an address in the critical region 106 that is near to the embossed area 101, the drive 1 performs tracking servo control after the second seek is made toward the area where tracking servo control can be performed reliably by the push-pull method. Accordingly, as far as the disk drive 1 does not read the embossed area 101, it is not essential that the drive 1 should have a control program for the DPD method.

Figure 4:
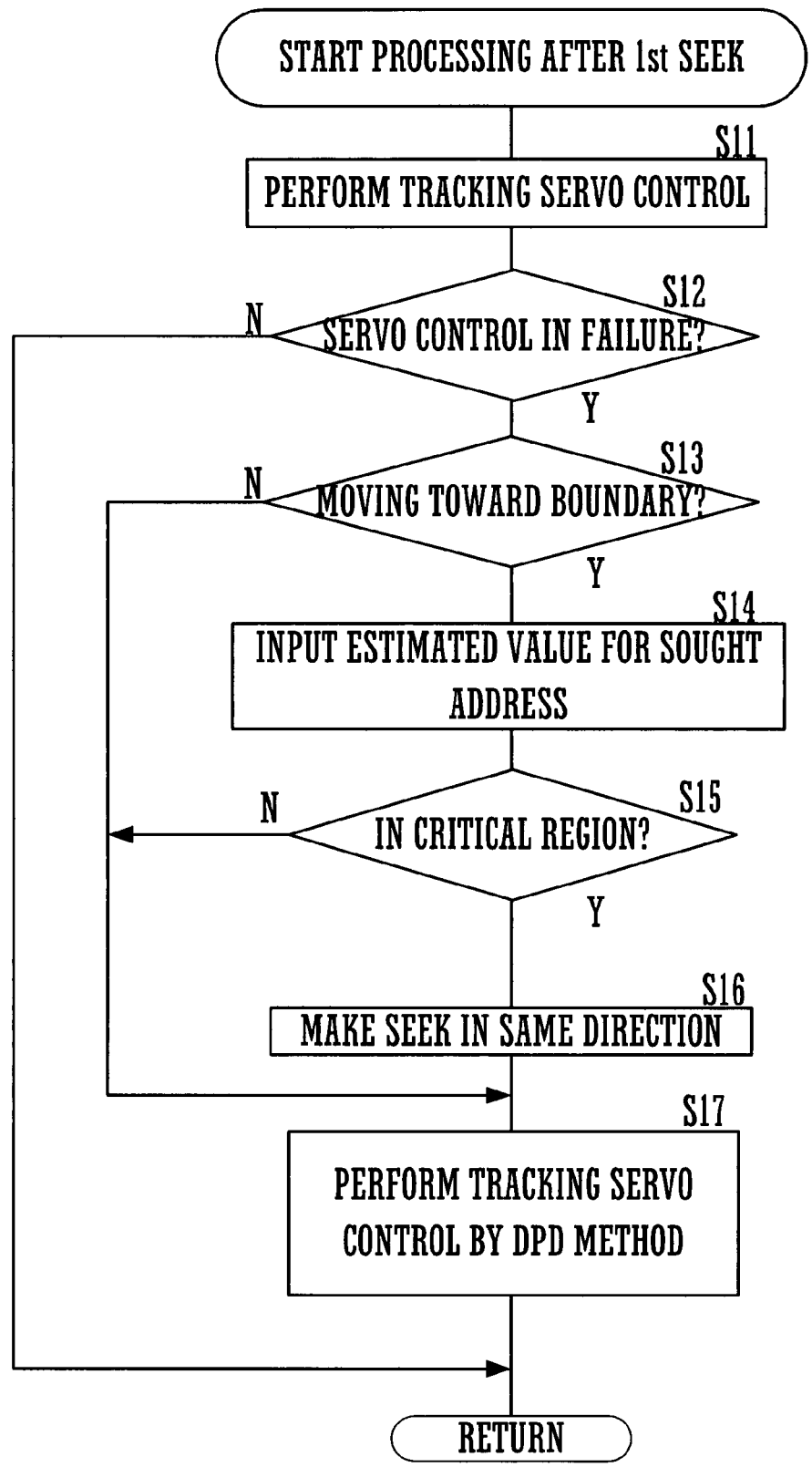
FIG. 4 is a flowchart of the processing after a first seek according to another embodiment of the present invention.

FIG. 4 shows the flows of the operation of the controller 11 after a first seek is made according to another embodiment of the present invention. FIG. 4 shows the operation flow after the first seek is made for a target address in the embossed area 101 from the rewritable area 102. In this case, likewise, no tracking servo control can be performed if the beam spot moves erroneously to an address in the rewritable area 102 that is near to the boundary 105. FIG. 4 shows the operation flow according to which the PU head 2 is moved to a condition under tracking servo control. S11-S17 in FIG. 4 correspond to S1-S7 respectively in FIG. 3. The descriptions of S1-S5 apply to S11-S15 respectively, which are similar to S1-S5 respectively.

S15 is the step of determining whether the address input at S14 is located in the critical region. If the input address is located in the critical region (yes at S15), the process goes to S16. If the input address is outside the critical region (no at S15), the process goes to S17.

For mounting purposes, the critical region in the embodiment shown in FIG. 4 may be the whole embossed area 101 because this area is narrow. Accordingly, the determination at S15 may be omitted, and S14 may be followed by S16.

S16 is the step of making a second seek a specified distance in the same direction as the spot was moved away from the rewritable area 102 toward the embossed area 101. The direction is away from the boundary on the embossed area 101. Because the embossed area 101 is narrow, the target address to which the beam spot is moved at S16 may be an address adjacent to the inner periphery of this area.

S17 is the step of performing tracking servo control by the DPD method, which is suitable for the embossed area 101.

Likewise, no tracking servo control can be performed if the beam spot has moved erroneously to an address in the embossed area 101 as a result of a first seek from this area for a target address in the rewritable area 102 that is near to the boundary 105. The process shown in FIG. 4 could apply to this case by replacing the embossed area 101 with the rewritable area 102, replacing the rewritable area 102 with the embossed area 101, and performing tracking servo control by the push-pull method at S17. In this case, the critical region at S15 may range from 30,000 h to 34,200 h as mentioned with reference to FIG. 3. The reason is that, if the address estimated after the seek is located in the critical region, the beam spot may move out of the embossed area 101 and stay in it.

S2 in FIG. 3 and S12 in FIG. 4 correspond to the condition "A" performed by the seeking means of the present invention. S3 in FIG. 3 and S13 in FIG. 4 correspond to the condition "C" performed by the seeking means. S5 in FIG. 3 and S15 in FIG. 4 correspond to the condition "D" performed by the seeking means.

It is determined in advance whether a DVD-R, a DVD-RW, or another optical disk for any point on which the same method of tracking servo control can be used is used or not. If such an optical disk is to be used, the processing shown in FIGS. 3 and 4 is not performed. In other words, it can be assumed that no tracking servo control may be able to be performed for such an optical disk due to the flaws in the disk, the dust on the disk, and/or the like, not due to a wrong method of tracking servo control. In this case, it is more highly possible to perform tracking servo control by trying tracking servo control again than by making another seek at S6 in FIG. 3 or S16 in FIG. 4. Therefore, if no tracking servo control can be performed by trying tracking servo control some times, another seek is made so that the flaws on the optical disk can be bypassed. Thus, because the processing shown in FIG. 3 or 4 is performed after an optical disk is discriminated, the seek at S6 or S16 is not made for an optical disk at any point on which the same method of tracking servo control can be used.

Consequently, because there is no needs for a useless seek, the operating speed of the disk drive 1 is prevented from lowering. The disk discrimination may include determining the reflectivity of the optical disk by measuring the intensity of the light received from the disk by a photodiode.

For determining whether performing S6 or not, the step of determining S2, S3, S4, S5 are in no special order, provided that the step S4 goes ahead S5. For determining whether performing S16 or not, the step of determining S12, S13, S14, S15 are in no special order, provided that the step S14 goes ahead S15.

What is claimed is:

1. An optical disk drive comprising:
   a main body;
   a pickup head for radiating a laser beam to a beam position on an optical disk set on the main body, the disk having a plurality of tracks;
   a controller for performing tracking servo control and causing the beam position to follow the tracks;
   a disk discriminating means for determining whether the optical disk has areas of a first area and a second area for which the tracking servo control is to be performed by a first method and a second method respectively, some of the tracks being formed in the first area, the other tracks being formed in the second area;
   a seeking means for causing the pickup head to perform seek operations;
   an estimating means for estimating the beam position where a laser beam is radiated from the pickup head stopping after the head is moved to make a first seek by the seeking means; and
   the seeking means being adapted to cause the pickup head to make a second seek by a specified number of addresses toward an opposite direction from the first seek, on the area including a target of the first seek, under all the conditions of the following (a)-(d), after the first seek is made;
   wherein the controller is adapted to perform the tracking servo control after the second seek made, and
   wherein, the conditions are as follows:
   (a) the controller cannot perform the tracking servo control at the beam position after the first seek is made;
   (b) the discriminating means determines that the optical disk has the first and second areas;
   (c) the first seek is made toward the direction of moving near a boundary between the areas, and (d) the beam position estimated after the first seek is made is inside a specified critical region including a boundary between the areas.

2. The optical disk drive according to claim 1, wherein, if the estimated beam position is not inside the critical region after the first seek is made, the controller tries the tracking servo control again at the beam position where the laser beam is radiated from the pickup head stopping after the first seek is made.

3. The optical disk drive according to claim 1 wherein the two areas of the optical disk includes a rewritable area of the first area and an embossed area of the second area inside the first area, the rewritable area includes a lead-in-zone rewritable area and a data-zone rewritable area, and the specified critical region includes the embossed area and the lead-in-zone rewritable area.

* * * * *